R. B. EARLE & L. P. KYRIAKIDES.
PROCESS FOR PRODUCING 1.3-GLYCOLS, (β-GLYCOLS.)
APPLICATION FILED NOV. 16, 1912.
1,094,315.
Patented Apr. 21, 1914.
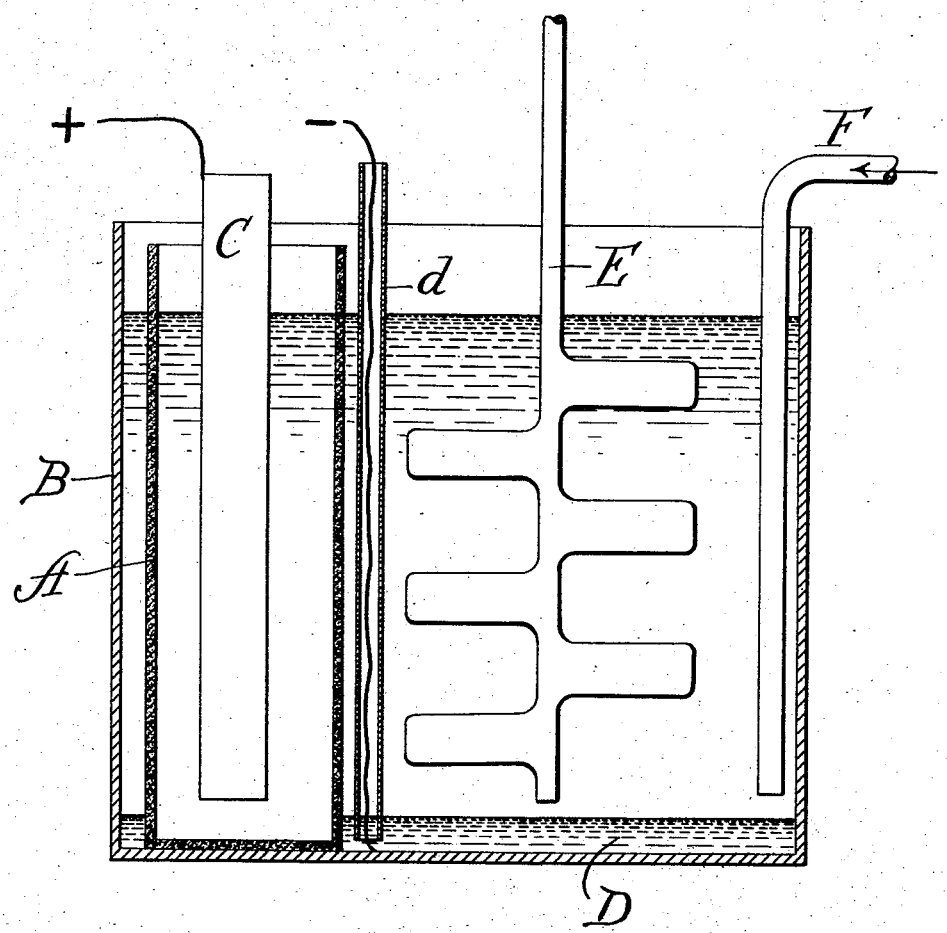
Attest:
Benton M. Stahl.
Ewd R. Tolson.
Inventors:
Richard B. Earle,
Lucas P. Kyriakides,
By their Attys.

UNITED STATES PATENT OFFICE.

RICHARD BLAIR EARLE AND LUCAS P. KYRIAKIDES, OF CAMBRIDGE, MASSACHUSETTS, ASSIGNORS TO HOOD RUBBER COMPANY, A CORPORATION OF MASSACHUSETTS.

PROCESS FOR PRODUCING 1.3-GLYCOLS, (β-GLYCOLS.)

1,094,315.     Specification of Letters Patent.     Patented Apr. 21, 1914.

Application filed November 16, 1912. Serial No. 731,832.

*To all whom it may concern:*

Be it known that we, RICHARD B. EARLE and LUCAS P. KYRIAKIDES, citizens of the United States, residing at Cambridge, Massachusetts, have invented certain new and useful Improvements in Processes for Producing 1.3-Glycols, (β-Glycols,) of which the following is a specification.

Our invention relates to a new and improved process for producing 1.3-glycols (β-glycols) of the general formula:

in which R is either hydrogen, or any organic radical, ethyl, methyl, propyl, etc. The glycols are useful in preparing hydrocarbons of the unsaturated series.

The new process consists in reducing aldols of the general formula:

$$CR_3\text{---}CHOH\text{---}CR_2\text{---}CHO,$$

in which R is either hydrogen, or an organic radical, electrolytically by use of a mercury cathode in sodium bicarbonate solution preferably at temperatures under 20° C. These aldols may be prepared from aldehydes in any known manner.

In order to explain the new process more fully, the following example is given, reference being had to the accompanying drawing showing conventionally an apparatus suitable for carrying out the process: A ten per cent. solution of acetaldol in water is saturated with sodium bicarbonate and used as the cathode solution in a cell which consists of a porous earthenware cup A, or other suitable material inserted in an outer vessel B. The clay cup is filled with saturated sodium bicarbonate solution and serves as the anode space. The anode $c$ is of platinum, carbon, or other unattackable material. On the bottom of the outer vessel of cathode space is a layer of mercury D which serves as the cathode, and the connection to which may be made through a glass tube $d$. The outer vessel may be cooled to below 20° C. by any suitable means (not shown). During the passage of the electric current the cathode liquid is continuously agitated by a stirrer E and a vigorous current of carbon dioxid passed in by suitable means such as pipe F to prevent the liquid from becoming too alkaline. A direct current of from 5 to 16 volts is employed with a current density of from 4 to 5 amperes per 100 sq. centimeters of cathode surface. The current is passed in for a slightly longer time than the theoretical. At the end of the operation the cathode liquid above the mercury is run off and distilled *in vacuo*. First water containing traces of glycol distils over, until finally the β-butylene glycol is collected at 108° C. at 13 mm. pressure. As the water contains small amounts of glycol it is used in subsequent electrolyses to avoid loss.

These aldols act in the usual way as cathode depolarizers and are thereby reduced.

No resinous matters and only traces of by-products are formed. The yield is over 80% of the theory and the current yield over 60% of the theory.

Having thus described our invention what we claim is:—

1. The process of producing 1.3-glycols which consists in reducing an aldol by an electric current in a solution of alkaline carbonate at a mercury cathode.

2. The process of producing 1.3-glycol which consists in reducing aldol by the electric current in sodium bicarbonate solution at a mercury cathode at a reduced temperature.

3. The process of producing 1.3-glycols which consists in reducing aldols by the electric current in sodium bicarbonate solution at a mercury cathode at temperatures below 20° C.

4. The process of producing 1.3-glycols which consists in reducing aldols in sodium bicarbonate solution at temperatures below 20° C. at a mercury cathode with a voltage of from 5 to 16 volts and current density of from four to five amperes per 100 sq. centimeters of cathode surface.

In testimony whereof, we affix our signatures in presence of two witnesses.

RICHARD BLAIR EARLE.
       LUCAS P. KYRIAKIDES.

Witnesses:
  M. A. HAGARTY,
  J. R. MOTT.